US009207973B2

(12) United States Patent
Clark et al.

(10) Patent No.: US 9,207,973 B2
(45) Date of Patent: *Dec. 8, 2015

(54) META-APPLICATION MANAGEMENT IN A MULTITASKING ENVIRONMENT

(71) Applicant: International Business Machines Corporation, Armonk, NY (US)

(72) Inventors: Adam T. Clark, Mantorville, MN (US); John E. Petri, St. Charles, MN (US)

(73) Assignee: International Business Machines Corporation, Armonk, NY (US)

( * ) Notice: Subject to any disclaimer, the term of this patent is extended or adjusted under 35 U.S.C. 154(b) by 329 days.

This patent is subject to a terminal disclaimer.

(21) Appl. No.: 13/843,242

(22) Filed: Mar. 15, 2013

(65) Prior Publication Data

US 2014/0282606 A1 Sep. 18, 2014

Related U.S. Application Data

(63) Continuation of application No. 13/828,507, filed on Mar. 14, 2013.

(51) Int. Cl.
*G06F 9/46* (2006.01)
*G06F 9/48* (2006.01)
*G06Q 10/10* (2012.01)
*G06F 9/445* (2006.01)

(52) U.S. Cl.
CPC .............. *G06F 9/4843* (2013.01); *G06F 9/445* (2013.01); *G06F 9/461* (2013.01); *G06Q 10/10* (2013.01); *G06Q 10/107* (2013.01); *G06Q 10/109* (2013.01)

(58) Field of Classification Search
None
See application file for complete search history.

(56) References Cited

U.S. PATENT DOCUMENTS

| 8,176,437 | B1* | 5/2012 | Taubman ...................... 715/810 |
| 8,850,351 | B2* | 9/2014 | Beharie et al. ................ 715/778 |
| 2004/0111499 | A1 | 6/2004 | Dobrowski et al. |
| 2004/0193813 | A1* | 9/2004 | Nguyen et al. ................ 711/156 |
| 2005/0268301 | A1* | 12/2005 | Kelley et al. .................. 718/100 |
| 2008/0005736 | A1* | 1/2008 | Apacible et al. .............. 718/100 |
| 2008/0250410 | A1* | 10/2008 | Soroker et al. ................ 718/100 |
| 2009/0307692 | A1* | 12/2009 | Do et al. ....................... 718/100 |
| 2009/0307693 | A1 | 12/2009 | Do et al. |
| 2011/0047288 | A1* | 2/2011 | Sakano ......................... 709/236 |
| 2011/0113232 | A1* | 5/2011 | Westmeijer ...................... 713/2 |
| 2011/0283296 | A1* | 11/2011 | Chun ............................ 719/318 |
| 2012/0159395 | A1* | 6/2012 | Deutsch et al. ............... 715/835 |
| 2012/0265978 | A1* | 10/2012 | Shenfield et al. ............. 713/100 |
| 2013/0283283 | A1* | 10/2013 | Wang et al. ................... 718/102 |

FOREIGN PATENT DOCUMENTS

WO          0153936   A2     7/2001

OTHER PUBLICATIONS

U.S. Appl. No. 13/828,507, entitled Meta-Application Management in Multitasking Environment, filed Mar. 14, 2013.

* cited by examiner

*Primary Examiner* — Abdullah Al Kawsar
(74) *Attorney, Agent, or Firm* — Patterson & Sheridan, LLP

(57) ABSTRACT

Techniques are disclosed to identify concurrently used applications based on application state. Upon determining that usage of a plurality of applications, including a first state of a first application of the plurality of applications, satisfies a criterion for identifying concurrently used applications, the plurality of applications is designated as a first meta-application having a uniquely identifiable set of concurrently used applications. The first meta-application has an associated criterion for launching the first meta-application. Upon determining that the criterion for launching the first meta-application is satisfied, at least one of the plurality of applications is programmatically invoked.

20 Claims, 12 Drawing Sheets

META-APPLICATION MANAGEMENT IN A MULTITASKING ENVIRONMENT

CROSS-REFERENCE TO RELATED APPLICATIONS

This application is a continuation of co-pending U.S. patent application Ser. No. 13/828,507, filed Mar. 14, 2013. The aforementioned related patent application is herein incorporated by reference in its entirety.

BACKGROUND

1. Field

Embodiments disclosed herein relate to facilitating user productivity in a multitasking environment. More specifically, embodiments disclosed herein relate to techniques for managing meta-applications in a multitasking environment.

2. Description of the Related Art

Applications that execute on a software-based computing platform may often be supported by an operating system that abstracts the hardware by providing an interface to facilities provided by the computing platform. Some operating systems may also provide an environment where several tasks may run concurrently, with a minimal of interference therebetween, but with support for safe data sharing. In that context, the operating system may manage the available hardware resources in a manner to promote fairness in resource allocation among the tasks.

SUMMARY

Embodiments presented in this disclosure provide a computer-implemented method to identify concurrently used applications based on application state. The method includes, upon determining that usage of a plurality of applications, including a first state of a first application of the plurality of applications, satisfies a criterion for identifying concurrently used applications, designating the plurality of applications as a first meta-application having a uniquely identifiable set of concurrently used applications. The first meta-application has an associated criterion for launching the first meta-application. The method also includes, upon determining that the criterion for launching the first meta-application is satisfied, programmatically invoking at least one of the plurality of applications.

Other embodiments presented in this disclosure provide a computer program product to identify concurrently used applications based on application state. The computer program product includes a computer-readable storage medium having program code embodied therewith. The program code is executable by one or more computer processors to, upon determining that usage of a plurality of applications, including a first state of a first application of the plurality of applications, satisfies a criterion for identifying concurrently used applications, designate the plurality of applications as a first meta-application having a uniquely identifiable set of concurrently used applications. The first meta-application has an associated criterion for launching the first meta-application. The program code is also executable in order to, upon determining that the criterion for launching the first meta-application is satisfied, programmatically invoke at least one of the plurality of applications.

Still other embodiments presented in this disclosure provide a system to identify concurrently used applications based on application state. The system includes one or more computer processors and a memory containing a program which, when executed by the one or more computer processors, is configured to perform an operation that includes, upon determining that usage of a plurality of applications, including a first state of a first application of the plurality of applications, satisfies a criterion for identifying concurrently used applications, designating the plurality of applications as a first meta-application having a uniquely identifiable set of concurrently used applications. The first meta-application has an associated criterion for launching the first meta-application. The operation also includes, upon determining that the criterion for launching the first meta-application is satisfied, programmatically invoking at least one of the plurality of applications.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
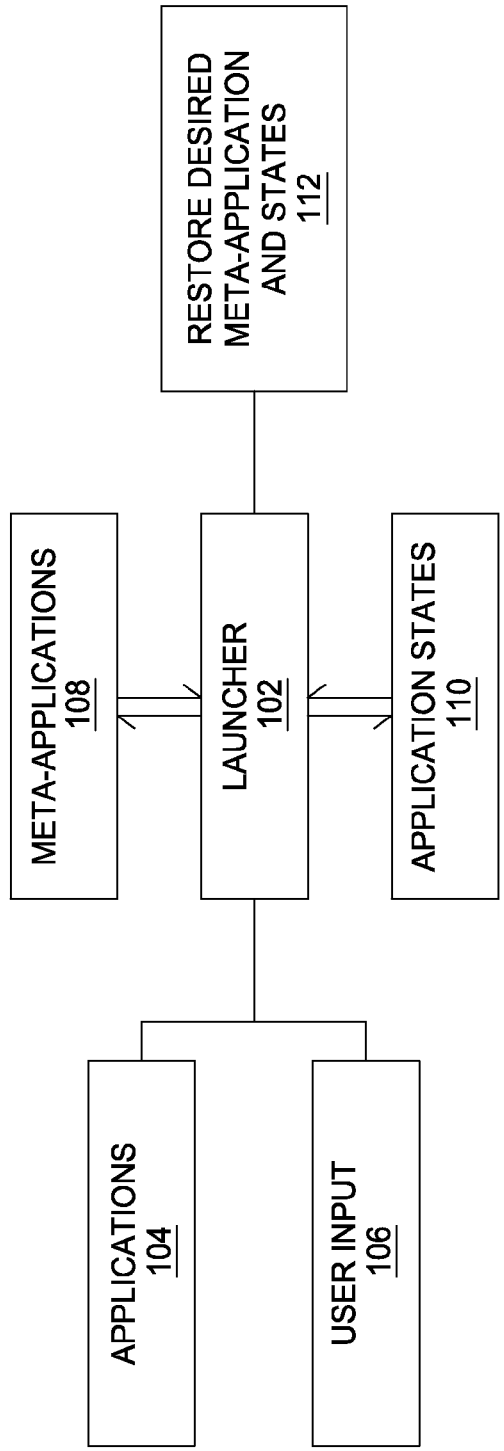
FIG. 1 is a block diagram illustrating a system to manage meta-applications, according to one embodiment presented in this disclosure.

Users may often access multiple different applications that execute simultaneously on a computing device. In part because information or capabilities provided by one application may not necessarily be similarly available in other applications, accomplishing a task may often entail several applications in specific states to first be arranged prior to beginning the task. One example includes opening a spreadsheet containing username and password information, launching a web browser to point to a specific uniform resource locator (URL) to log in to a specific web application, and running an email client to compose a new email message. Such applications and states may then allow the user to perform a desired task involving retrieving desired information from the web application, pasting the information into the new email message, and sending the new email message to a desired recipient. In situations where the task is often repeated, the process of the user identifying a set of applications desired for the task, manually running each application, and navigating to an appropriate state in each application may be tedious and time-consuming at least in some cases. Further, some situations may pose even greater difficulty to performing the tasks, such as when the user is alternating between multiple distinct tasks, each having a different set of associated applications.

Accordingly, at least some embodiments presented in this disclosure provide techniques to identify sets of applications that tend to be used concurrently by a user, such as to perform a specific task. If the user subsequently only launches a subset of applications of an identified set, the remaining applications in the identified set may be launched for the user automatically, in response to user confirmation, or in response to user request. Further, application states may be captured automatically or in response to a user request and subsequently restored. Examples of application states include a uniform resource locator (URL) in a web browser, a currently opened file in a word processor along with a line number and a cursor position, and a connected database server in a database browser along with active database connections and database entities being interacted with. Identified sets of applications may also be referred to herein as meta-applications. Further, the degree of interoperability between the applications may vary from case to case. For example, in some embodiments, the applications have a high degree of interoperability, and a comparatively smaller degree orchestration by the user is involved. In other embodiments, the applications have a low or no degree of interoperability, and comparatively higher degree of orchestration by the user is involved.

In some embodiments, applications may be further qualified by application state in the identification process. That is, such embodiments include identifying sets of applications or application states that tend to be used concurrently by a user. In other words, application states may be used as an input in identifying and qualifying sets of applications that tend to be used together. Accordingly, different states of a given application may result in different applications that are suggested to be launched. At least in some embodiments, the application states are also restored upon launching the applications. Consequently, sets of applications that tend to be used together by a user, including respective states thereof, may be more accurately identified and restored for a user. Such restoration of application and states may also be referred to herein as content-aware application recall. Thus, user productivity in a multitasking environment may be improved at least in some cases, at least relative to alternative approaches that do not take into account, capture, or restore application states in identifying sets of applications that tend to be used concurrently.

Hence, one embodiment disclosed herein provides a launcher tool that is configured to automatically manage meta-applications for the user. Meta-applications may also be referred to as application groups, and the launcher tool may also be referred to herein as a launcher. Managing the meta-applications may include operations such as creating, identifying, storing, and restoring the meta-applications for the user. Restoring the meta-applications is also referred to as loading or recalling the meta-applications.

Accordingly, the meta-applications may effectively provide "snapshots" of a multitasking environment suitable for completing one or more given tasks, where the snapshots may subsequently be restored so that the user may resume the given tasks. The snapshots may include state information associated with each application. In restoring meta-applications, application states may also be restored based on the state in formation. In some embodiments, the meta-applications are managed without requiring any explicit input from the user. In other embodiments, the user is prompted to confirm each operation that the launcher is to perform. In still other embodiments, the user may also explicitly request that the launcher perform a desired operation.

For example, a first meta-application may provide a developer with a document containing database notes and opened in a word processor, a database documentation webpage opened in a web browser, and a database control panel tool that is connected to a database referenced in the database notes. A second meta-application may provide an inventor with access to invention disclosure information opened in an application for managing patent dockets, an online patent search tool opened in a web browser, and a group chat window in an instant messaging (IM) application and involving the co-inventors named in the invention disclosure information. Each meta-application and/or the states thereof may be launched or closed based on user request. In some embodiments, any application in a given meta-application and that is not yet invoked may be launched automatically for the user without user intervention or upon user confirmation. Additionally or alternatively, the states thereof may also be launched automatically for the user.

FIG. 1 is a block diagram 100 illustrating a system to manage meta-applications, according to one embodiment presented in this disclosure. As shown, the system includes a launcher 102 configured to detect usage of applications 104. In some embodiments, user preferences for the launcher 102 may be configured via user input 106. The launcher 102 automatically designates a set of concurrently executing applications as a new meta-application, upon determining that usage of the set of concurrently executing applications satisfy predefined criteria for storing information designating the set of concurrently executing applications as a new meta-application, of the meta-applications 108. State information pertaining to the set of concurrently executing applications may also be stored as application states 110.

For example, in some embodiments, the predefined criteria may include meta-frequency, meta-duration, and least-common meta-application. Meta-frequency refers to a measure of how often a set of applications is manually launched proximate in time to one another and/or how often the applications are in a characteristic set of application states when concurrently executing. Meta-duration refers to how long a set of applications execute concurrently and/or how long the applications are in the characteristic set of application states. Least-common meta-application refers to how often a specific subset of applications executes concurrently, where the subset is selected from all currently executing applications.

At least in some embodiments, the more proximate in time a set of applications are launched relative to one another, the more often the set of applications is in a characteristic set of application states when concurrently executing, and the longer the set of applications execute concurrently, then the more likely that the launcher 102 designates the set of applications as a new meta-application recognized by the launcher 102. In some embodiments, measures of user interactivity with each application may also be taken into account by the launcher 102. For example, an application in the set and with which the user has little or no recent interaction may be excluded from the meta-application, even if the application otherwise would become part of the meta-application.

After creating the meta-application, the launcher 102 may determine whether subsequent application usage satisfies predefined criteria for loading the meta-application. If so, the launcher 102 invokes at least one application that is part of the meta-application. In some embodiments, the launcher 102 invokes all yet-to-be-invoked applications in order to complete the meta-application—e.g., such that all applications that are part of the meta-application are executing concurrently. In other embodiments, the launcher 102 invokes less than all of the yet-to-be-invoked applications, upon user confirmation or based on an explicit user request.

In some embodiments, to determine whether subsequent application usage satisfies predefined criteria for loading the meta-application, the launcher 102 may determine a current execution state associated with the user, which includes all currently executing applications and the respective states thereof. The current execution state may also be referred to as a current user state. Depending on the embodiment, the current execution state may also include one or more measures associated with the currently executing applications, such as time of invocation, duration of execution, usage frequency, user interactivity, etc. The launcher 102 may then compare the current execution state with each of the meta-applications 108 to determine one or more partial matches, each partial match having an associated similarity score. The similarity scores may be determined based on a predefined function of one or more of the measures and may further include respective weights for each measure. The predefined function may be tailored to suit the needs of a particular case.

In one embodiment, partial matches having a similarity score beyond a predefined loading threshold are then identified by the launcher 102. Each partial match is a different meta-application partially—but not completely—matching the current execution state. Further, complete matches may be disregarded by the launcher 102, because a meta-application that is a complete match is already executing in its entirety and need not have any component application launched. For each meta-application partially matching the current execution state and satisfying the predefined loading threshold, the launcher 102 may launch one or more applications in the respective meta-application, yet to be launched.

For example, suppose the first meta-application described above is returned as a partial match in terms of the word processor and the web browser. The launcher 102 may determine a set difference between the first meta-application and a subset of the first meta-application corresponding to the partial match: {word processor, web browser, database control panel tool}−{word processor, web browser}={database control panel tool}. The launcher 102 may then launch the set difference—e.g., database control panel tool—without user intervention or upon user confirmation. At least in some embodiments, the manner in which the set difference is determined may be expressed as one or more rules for determining missing applications to launch. A meta-application partially matching the current execution state and satisfying the predefined loading threshold may be referred to as a qualified partial match. The predefined loading threshold may be tailored to suit the needs of a particular case.

In some embodiments, by matching a current execution state with previously stored meta-applications and identifying partial matches, the launcher 102 may present sets of applications and associated states that the user may previously have found useful but that the user has subsequently neglected, forgotten about, or found it difficult to navigate back to. For example, suppose that the user, after using the first meta-application described above and writing database notes in the word processor, forgets about the existence of the database notes in subsequent use of the web browser and the database control panel tool. Based on the techniques disclosed herein, the launcher 102 may automatically open the database notes—launching the word processor in the process also, if not already launched—thereby completing a launch of the first meta-application and associated state and without requiring any intervention on the part of the user.

Other embodiments are broadly contemplated. For example, in one embodiment, each meta-application is launched and/or organized into a different virtual desktop for the user. In another embodiment, a user may specify how to load a desired state for a currently executing application having a different state. For example, if the application is a web browser, a desired state specifying a target web page and scrollbar position may be loaded in the current web browser window, in a new browser window, or in a new browser tab, based on preferences indicated by the user.

Accordingly, the launcher 102 may manage meta-applications 108 and application states 110 based on the techniques disclosed herein. For example, the launcher 102 may initiate an operation 112 to restore desired meta-applications and/or states, without user intervention or upon user confirmation. Thus, productivity of the user of the applications 104 may be improved at least in some cases.

Figure 2:
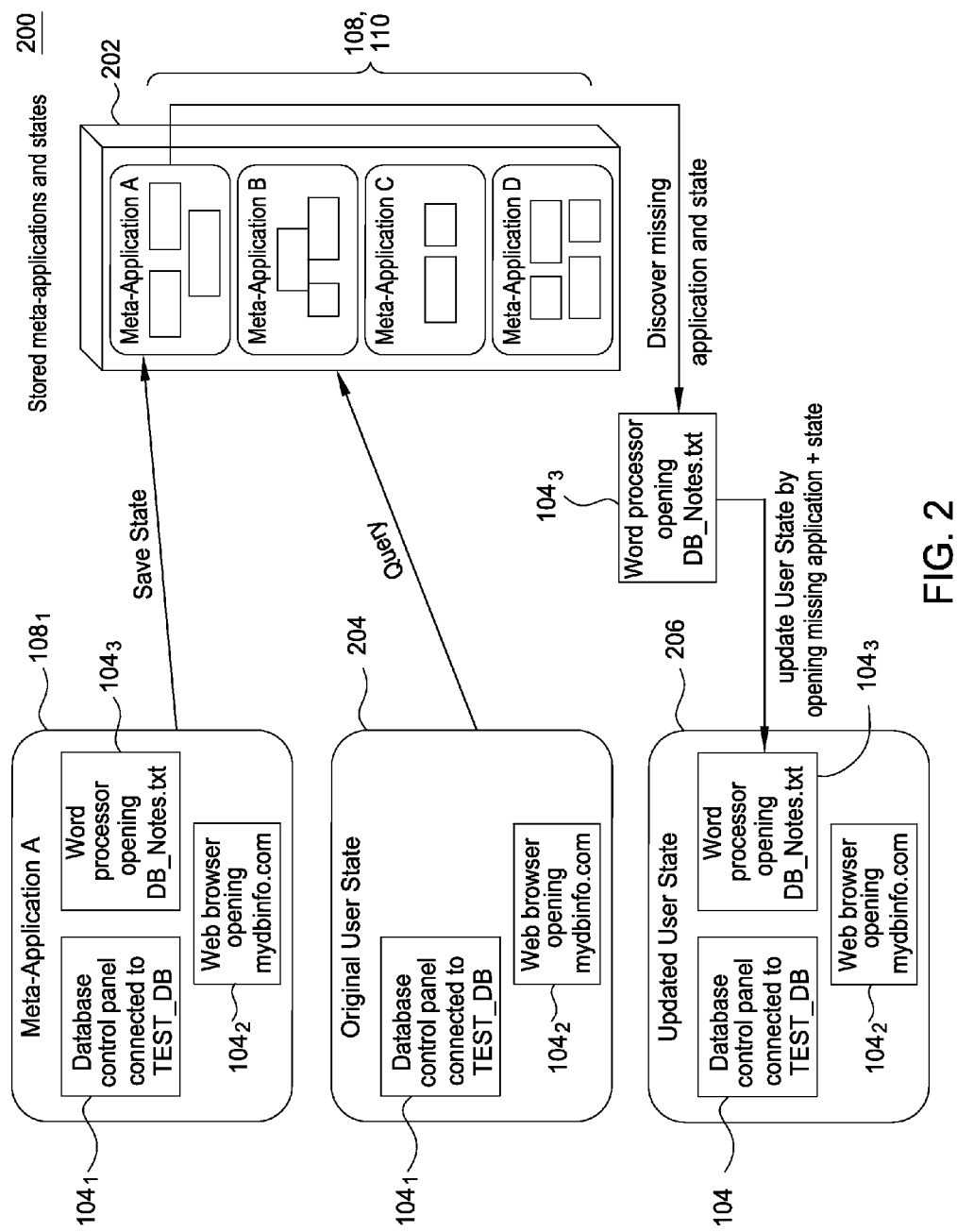
FIG. 2 illustrates a scenario in which a meta-application is restored, according to one embodiment presented in this disclosure.

FIG. 2 illustrates a scenario 200 in which a meta-application is restored, according to one embodiment presented in this disclosure. As shown, the scenario 200 includes meta-applications and states 202 previously identified and stored for the user. Assume that a first meta-application $108_1$ has been executing for a lengthy period of time. As shown, the meta-application $108_1$ includes a database control panel $104_1$, a web browser $104_2$, and a word processor $104_3$. In one embodiment, the launcher 102 determines that the states of the meta-application $108_1$ should be and captures the state information in a state repository. In this particular example, the state information indicates that the database control panel $104_1$ is connected to a database identified as TEST_DB, that the web browser $104_2$ is displaying a webpage from at a URL of mydbinfo.com, and that the word processor $104_3$ is displaying a document identified as DB_Notes.txt.

Assume also that subsequently, only two of the applications of the meta-application $108_1$—namely, the database control panel $104_1$ and the web browser $104_2$—are in use, as reflected by the user state 204. In one embodiment, the launcher 102 may, either without user intervention or upon an explicit user request, compare the user state 204 with the stored meta-applications and states 202 in an attempt to find qualified partial matches. Assume that the meta-application $108_1$ is returned as a qualified partial match. The launcher 102 may then identify one or more applications not currently executing, also referred to herein as "missing" applications. In this particular example, the word processor $104_3$ is identified as the missing application. The launcher 102 may then prompt the user to confirm that the word processor $104_3$ and the associated state thereof should be loaded. Upon user confirmation, the launcher 102 loads the word processor $104_3$ and the associated state, thereby restoring the meta-application $108_1$, as reflected in the updated user state 206. Accordingly, based on the techniques disclosed herein, the launcher 102 is configured to automatically provide recommendations to the user of applications and states to launch and restore, in order to recreate a multitasking environment previously automatically identified and stored for the user as being a potentially desirable multitasking environment.

Figure 3:
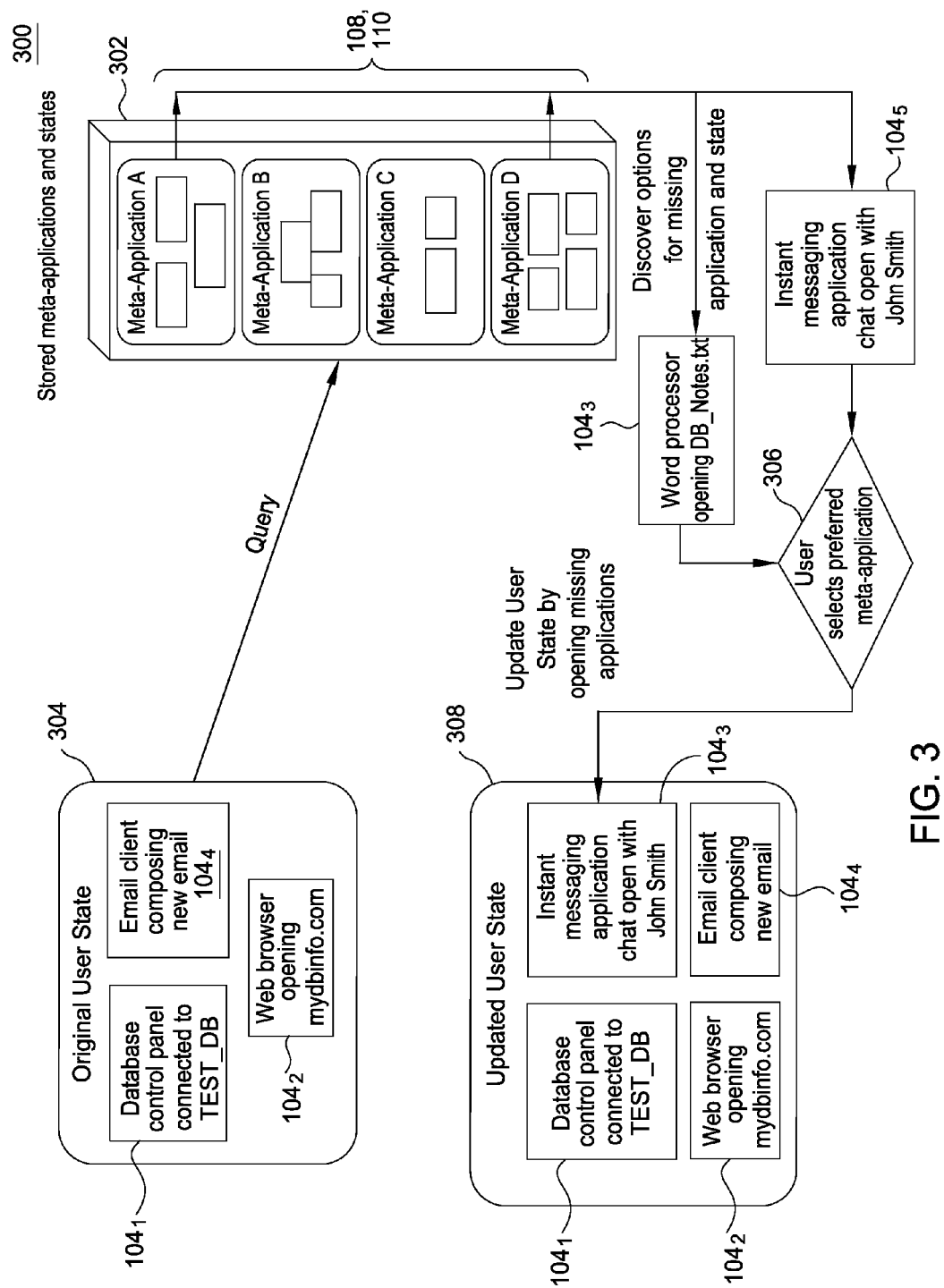
FIG. 3 illustrates a scenario in which a user selection is made between two qualified partial matches for a user state, according to one embodiment presented in this disclosure.

FIG. 3 illustrates a scenario 300 in which a user selection is made between two qualified partial matches for a user state 304, according to one embodiment presented in this disclosure. As shown, the scenario 300 includes meta-applications and states 302 previously identified and stored for the user. As shown, the user state 304 indicates that three applications are executing concurrently—namely, the database control panel $104_1$, the web browser $104_2$, and an email client $104_4$. The user state 304 also includes state information indicating that the database control panel $104_1$ is connected to the database identified as TEST_DB, that the web browser $104_2$ is displaying the webpage at the URL of mydbinfo.com, and that the email client $104_4$ is displaying a window for composing a new email message. Assume that the user, having merely a faint recollection of a fourth application previously run by the user weeks prior, now cannot positively identify the fourth application or its associated state. Assume also that two qualified partial matches are found among the stored meta-applications and states 302. The first partially matching meta-application indicates to launch, as the missing application, the word processor $104_3$ to display the document identified by the filename DB_Notes.txt. On the other hand, the second partially matching meta-application indicates to launch, as the missing application, an instant messaging application $104_5$ to display a chat window with an individual by the name of John Smith. Because partial matching, rather than full matching, is performed by the launcher 102, the fact that the email client $104_4$ is currently executing does not prevent the first meta-application from becoming a qualified partial match—even though the first meta-application does not include the email client $104_4$ as an application. In one embodiment, the launcher 102 presents the user with a selection between the two missing applications. Suppose the user then selects the instant messaging application $104_5$ at step 306. Then the launcher 102 invokes the instant messaging application $104_5$ and restores the state thereof, resulting in an updated user state 308. The user may then resume work in the multitasking environment previously identified for the user and now fully restored for the user.

Figure 4:
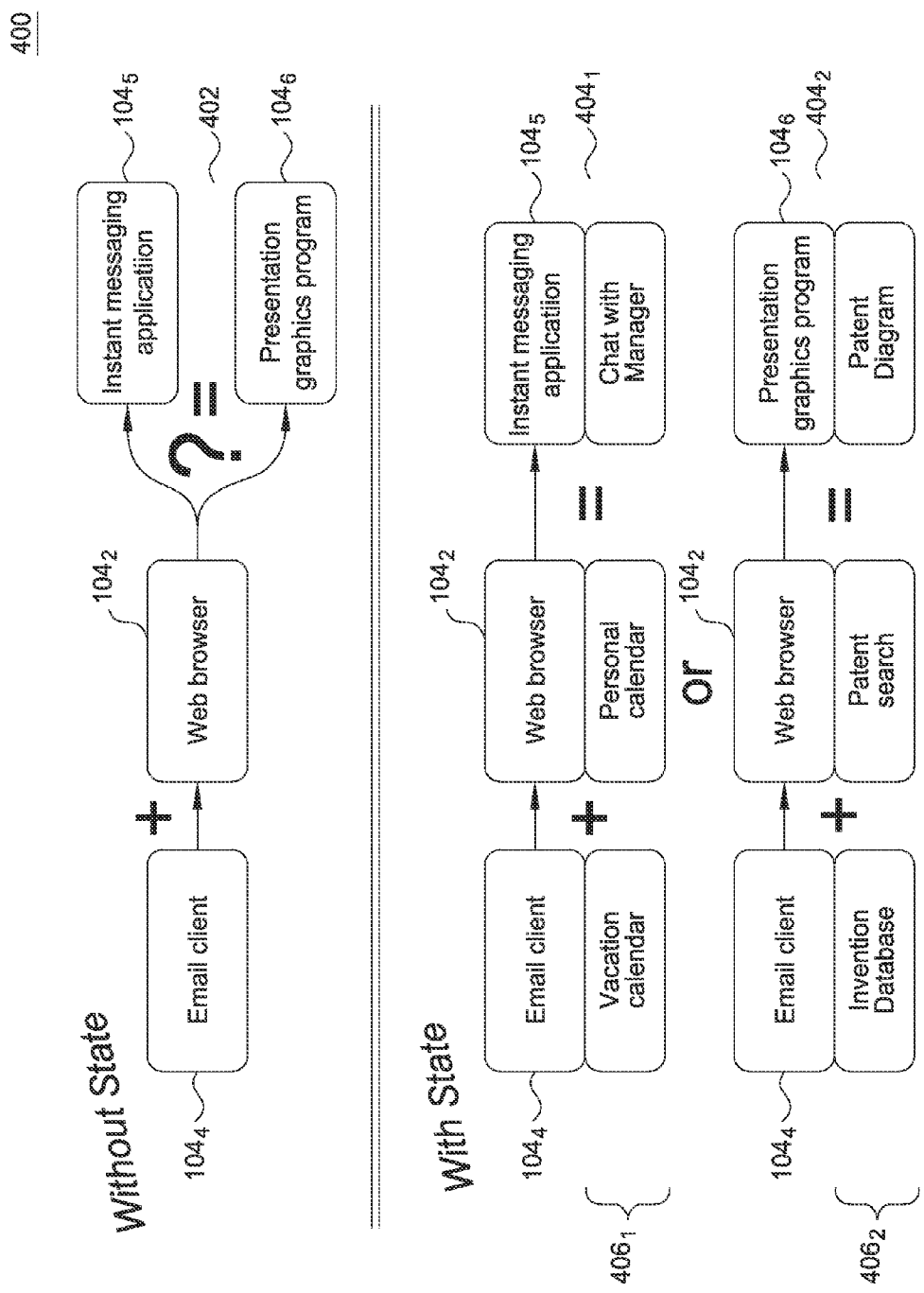
FIG. 4 illustrates scenarios in which a programmatic selection is made between two qualified partial matches for a user state, according to one embodiment presented in this disclosure.

FIG. 4 illustrates scenarios 400 in which a programmatic selection is made between two qualified partial matches for a user state, according to one embodiment presented in this disclosure. Some applications may be sufficiently complex such that the application states thereof may characterize the current task or use case of the user more so than the applications themselves. For instance, it may be more significant to learn whether the user is using a web-based email application or an online shopping portal rather than to merely learn that the user is currently using a web browser. At least in some embodiments, when state information is taken into consideration, the current task may be more distinctly identified and acted upon accordingly. Thus, in one embodiment, a missing application to invoke may be selected based not only on the executing applications but also on the states thereof, as reflected in the user state.

Assume that in a first scenario $404_1$, a first user accesses a vacation calendar via the web browser $104_2$ and is reminded that a personal engagement is scheduled for the following day. The first user may then access a work calendar via the email client $104_4$ to schedule a vacation day to accommodate the personal engagement. Before logging the vacation day, the first user may also access a chat window of the instant messaging application $104_5$ to verify with a manager that the absence on short notice is acceptable.

Assume that in a second scenario $404_2$, a second user accesses the web browser $104_2$ to perform Internet searches for prior art pertaining to a new patent idea of the second user. The second user may then use the email client $104_4$ to access an internal invention database in order to begin drafting an invention disclosure for the new patent idea. The second user may then use the presentation graphics program $104_6$ to create some diagrams to illustrate aspects of the new patent idea.

In both of the scenarios $404_{1-2}$, the email client $104_4$ and the web browser $104_2$ are used. When the email client $104_4$ and the web browser $104_2$ are subsequently executed, some approaches—such as those that only consider which applications are executing and that do not consider states $406_{1-2}$ associated therewith—may not be able to distinguish between the two scenarios $404_{1-2}$, as reflected by a third scenario 402. For example, in the third scenario 402, the launcher 102 may determine two candidate applications to launch, including the instant messaging application $104_5$ and the presentation graphics program $104_6$, to complete the different meta-applications, respectively. But in the third scenario 402, the launcher 102 may not necessarily be able to select the application actually desired by the user. At least in some cases, an incorrect application may be selected, unless the user is asked to and able to select the correct application to launch.

On the other hand, in approaches that do take into account which applications are executing and further take into account the states $406_{1-2}$ associated therewith—such as in the two scenarios $404_{1-2}$, the launcher 402 may correctly select the desired application for each user and without user intervention. The launcher 402 may also restore the state of the selected application. Accordingly, configuring the launcher 102 to store application states and to consider application states in selecting applications to launch may, at least in some cases, improve accuracy of the launcher 102 in selecting the correct applications for restoring desired multitasking environments.

In some embodiments, various techniques may be used in identifying, storing, and loading application states. Some application states may be sufficiently captured by storing a reference to any document or data currently open in the application, e.g., a file pathname for a word processor, a URL for a web browser, etc. Other applications may be adequately represented in the meta-application, even if no application state associated therewith is captured.

However, still other applications may have states that may not necessarily be readily captured via certain predefined techniques, such as via operating-system-level calls. One example of such an application may be an email client configured to provide email functionality, calendar functionality, and database access functionality. If the associated application state is not captured, then the launcher 102 may not be able to restore a state of the desired functionality within the email client, when the email client is subsequently launched for the user. In such scenarios, the available options may be as follows. If no state is readily discoverable, the application may just be stored as having no available state information. In such scenarios, the meta-application merely indicates that the application executes simultaneously with the other applications of the meta-application. Doing so, however, may lower application selection accuracy at least in some cases, because the application may be considered "noise" when searching for meta-applications matching a current user state.

As an alternative, in one embodiment, application-specific state searching tools may be implemented, that are configured to capture state for a given application via existing application programming interfaces (APIs). Doing so may allow, for example, a mechanism specific to the email client and that would request a shortcut to a current focus or context within the email client. Subsequent re-invocation of the shortcut may restore the state of the email client as desired. Such an approach may apply to at least a subset of applications such as word processors, web browsers, and integrated development environments (IDEs) without undue effort at least in some cases. This approach may also be applied to an expanded set of applications based on additional implementation of aspects of the application-specific state searching tools as needed.

In some embodiments, multitasking environments having an arbitrarily large number of concurrently executing applications may be filtered to disqualify applications that are not deemed to belong to any specific meta-application. For example, certain applications, such as the email client $104_4$ and the instant messaging application $104_5$, may often be executing even when not actively being used. In one embodiment, such applications should not be included in any new meta-applications being generated. To this end, the following approaches may be adopted. If an application is executing but used infrequently, then the application may be flagged as being potentially inactive, such as by lowering an activity score being maintained for the application. The determination that the application is used infrequently may be made based on a small number of interactions monitored between the user and the application, the application being minimized to a task bar of a window manager, the application being minimized to a system tray of the window manager, etc. The lowered activity score results in a lower likelihood for the application to be included in a new meta-application. Additionally or alternatively, if an application was manually launched long before a new set of applications are manually launched, the application may also be discounted.

Further still, in scenarios where the launcher 102 incorrectly includes an application in a new meta-application, the user may manually reconfigure the new meta-application using the launcher 102, such as providing a manual override, in order to de-select applications that are not part of a desired multitasking environment. Allowing such manual intervention by a user may further improve accuracy of partial matching and restoring of applications and associated states at least in some cases. In some embodiments, each indication of inactivity described above may be accorded a different weight, and the weights may be tailored to suit the needs of a particular case.

In one embodiment, the launcher 102 provides a graphical user interface (GUI) that may include a variety of windows including an alert window, a main window, and a settings window, each of which is discussed in further detail below.

Figure 5:
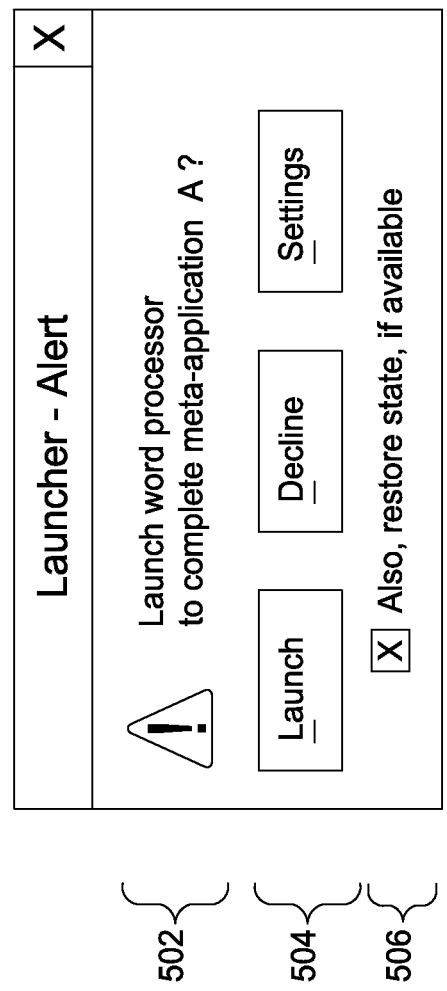
FIG. 5 illustrates an alert window of a launcher tool, according to one embodiment presented in this disclosure.

FIG. 5 illustrates an alert window 500 of the launcher 102 of FIG. 1, according to one embodiment presented in this disclosure. As shown, the alert window 500 includes an alert 502, buttons 504, and checkbox 506. The buttons 504 include a launch button, a decline button, and a settings button. As shown, the alert prompts the user to indicate whether to launch the word processor in order to complete a corresponding meta-application. The user may activate the launch button to launch the word processor. Alternatively, the user may activate the decline button to close the alert window 500 without launching the word processor. Still alternatively, the user may activate the settings button to access a settings window of the GUI. The settings window is further described below in conjunction with FIG. 7. Further, the user may activate the checkbox to indicate to restore any available state associated with the application to be launched. Alternatively, the user may deactivate the checkbox to indicate to refrain from restoring any available state associated with the application to be launched.

Figure 6:
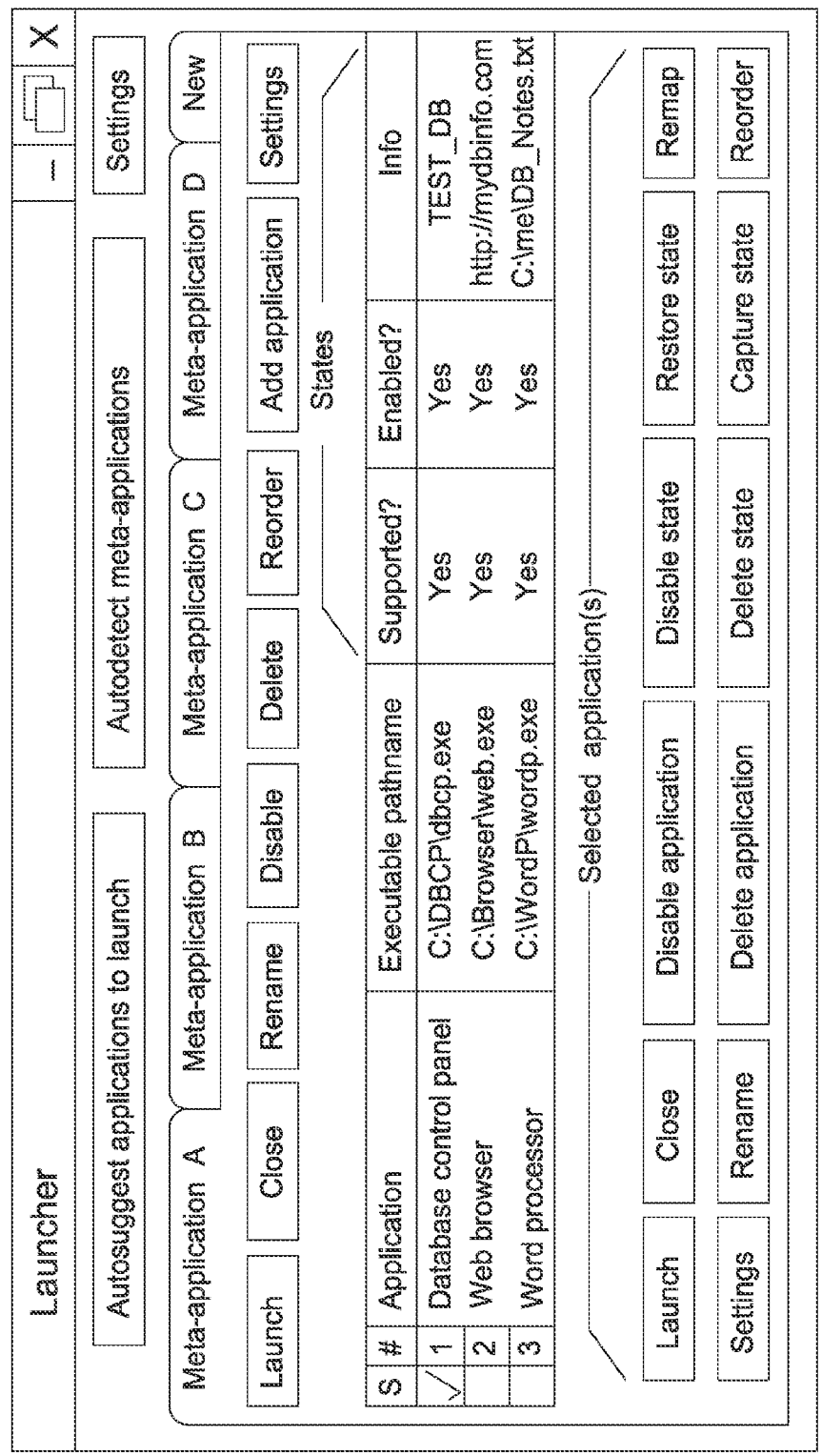
FIG. 6 illustrates a main window of the launcher tool, according to one embodiment presented in this disclosure.

FIG. 6 illustrates a main window 600 of the launcher 102 of FIG. 1, according to one embodiment presented in this disclosure. As shown, the main window 600 includes launcher-specific operations 602, stored meta-applications 604, meta-application-specific operations 606, contents 608 of a given meta-application, including application and state information, and application-specific operations 610. The launcher-specific operations 602 allow the user to submit an explicit, one-time request for the launcher 102 to automatically suggest applications to launch or automatically detect new meta-applications, or configure settings associated with all meta-applications.

For a given one of the stored meta-applications 604 selected by activating an associated tab, the meta-application-specific operations 606 allow the user to launch the given meta-application, launch the given meta-application, rename the given meta-application, disable the given meta-application, delete the given meta-application as being a member of the available meta-applications, reorder the given meta-application relative to other meta-applications, add a specified application to the given meta-application, and configure settings associated with the given meta-application. The user may also click on a new tab to manually create a new meta-application to be added to the stored meta-applications 604.

The contents 608 of the given meta-application include a list of all applications included in the meta-application, an associated ordering of each application, an associated checkbox for selecting each application, an executable pathname of each application, indicates of whether states are supported or enabled for the respective application, and state information, if any, associated with the respective application.

For a given one of the applications selected via the checkbox, the application-specific operations 610 allow the user to launch the given application, close the given application, disable the given application, disable a state stored for the given application, restore a state for the given application, remap the given application to a new pathname, rename the given application, delete the given application as a member of the meta-application, delete a state for the given application, capture a state for the given application, reorder the given application relative to other applications in the meta-application, and configure settings specific to the given application. The settings at each level of granularity may be configured via the settings window, which is further described below in conjunction with FIG. 7.

Figure 7:
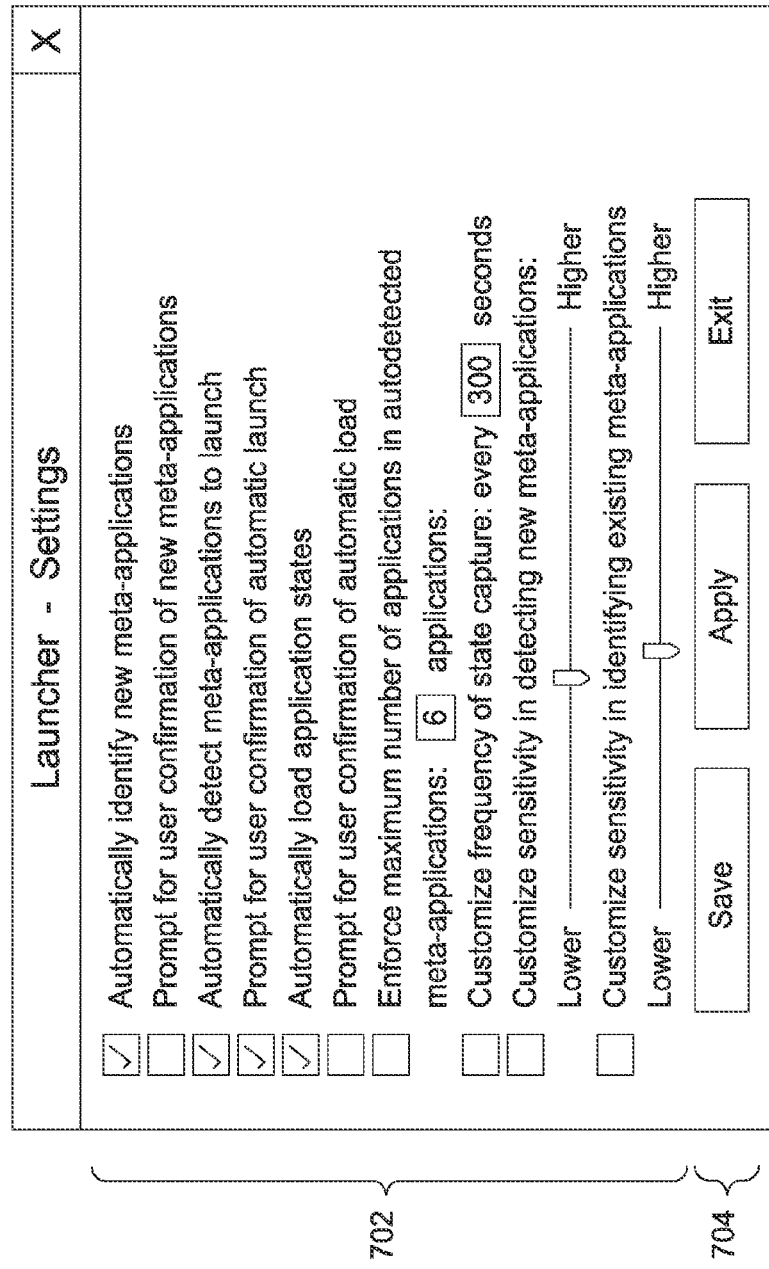
FIG. 7 illustrates a settings window of the launcher tool, according to one embodiment presented in this disclosure.

FIG. 7 illustrates a settings window 700 of the launcher 102 of FIG. 1, according to one embodiment presented in this disclosure. As shown, the settings window 700 includes settings 702 and buttons 704. The buttons include a save button, an apply button, and an exit button. Depending on the embodiment, each setting may pertain to a given application, a given meta-application, or all meta-applications. A first one of the settings 702 allows user configuration of whether the launcher 102 automatically identifies new meta-applications. A second one of the settings 702 allows user configuration of whether the launcher 102 prompts for user confirmation of new meta-applications prior to creating them.

A third one of the settings 702 allows user configuration of whether the launcher 102 automatically detects new meta-applications to launch. A fourth one of the settings 702 allows user configuration of whether the launcher 102 prompts for user confirmation of an automatic launch. A fifth one of the settings 702 allows user configuration of whether the launcher 102 automatically loads application states. A sixth one of the settings 702 allows user configuration of whether the launcher 102 prompts for user confirmation when automatically loading application states.

A seventh one of the settings 702 allows user configuration of whether the launcher 102 enforces a maximum number of applications in a single, automatically detected meta-application, where the maximum number may be specified by the user. An eighth one of the settings 702 allows user configuration of the frequency with which the launcher 102 captures application state information, where the time window triggering capture is configurable by the user. A ninth one of the settings 702 allows user configuration of the sensitivity of the launcher 102 in detecting new meta-applications, via a slider control. A tenth one of the settings 702 allows user configuration of the sensitivity of the launcher 102 in identifying existing meta-applications, also via a slider control.

In one embodiment, after configuring the settings 702, the user may activate the save button to save the settings, activate the apply button to apply the changes, and/or activate the exit button to exit the settings window 700. The names, types, and number of settings may be tailored to suit the needs of a particular case.

Figure 8:
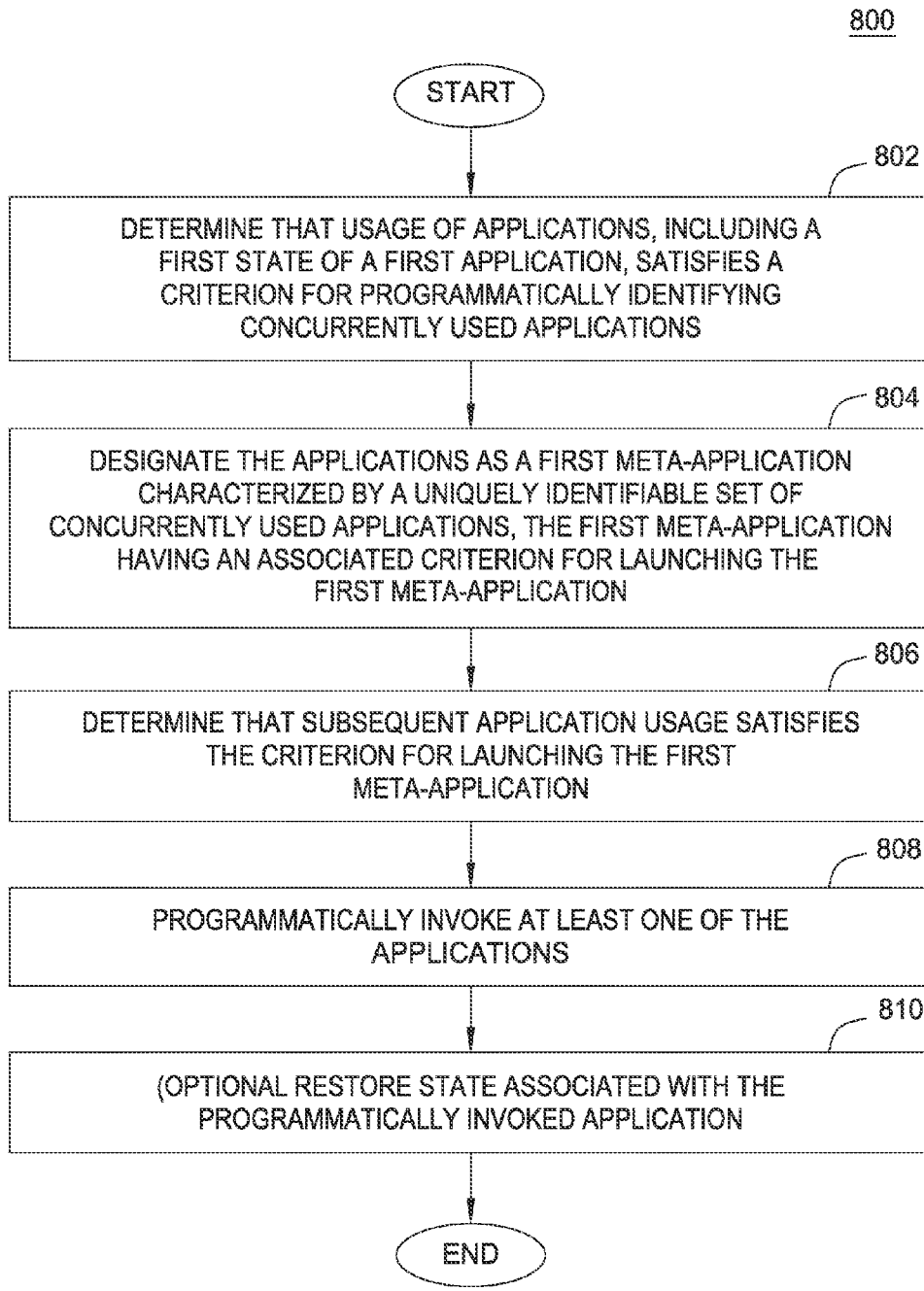
FIG. 8 is a flowchart depicting a method to restore a meta-application, according to one embodiment presented in this disclosure.

FIG. 8 is a flowchart depicting a method 800 to restore a meta-application, according to one embodiment presented in this disclosure. As shown, the method 800 begins at step 802, where the launcher 102 determines that usage of applications, including a first state of a first application, satisfies a criterion for programmatically identifying concurrently used applications. At step 804, the launcher 102 designates the applications as a first meta-application characterized by a uniquely identifiable set of concurrently used applications, the first meta-application having an associated criterion for launching the first meta-application.

In some embodiments, each meta-application is uniquely identifiable via a respective meta-application name and/or via a respective meta-application identifier, respectively. Further, each application is uniquely identifiable via a respective application name and/or via a respective application identifier, respectively. Further still, each application state is uniquely identifiable via a respective state name and/or via a respective state identifier, respectively. At least in some embodiments, multiple states may be stored for each application. The steps 802-804 are discussed in further detail below in conjunction with FIG. 9.

At step 806, the launcher 102 determines that subsequent application usage satisfies the criterion for launching the first meta-application. In some embodiments, the criteria for identifying concurrently used applications and for launching the first meta-application, respectively, are different criteria. At step 808, the launcher 102 programmatically invokes at least one of the applications. At step 810, the launcher 102 optionally restores a state associated with the programmatically invoked application. The steps 806-810 are discussed in further detail below in conjunction with FIG. 10. After the step 810, the method 800 terminates.

Figure 9:
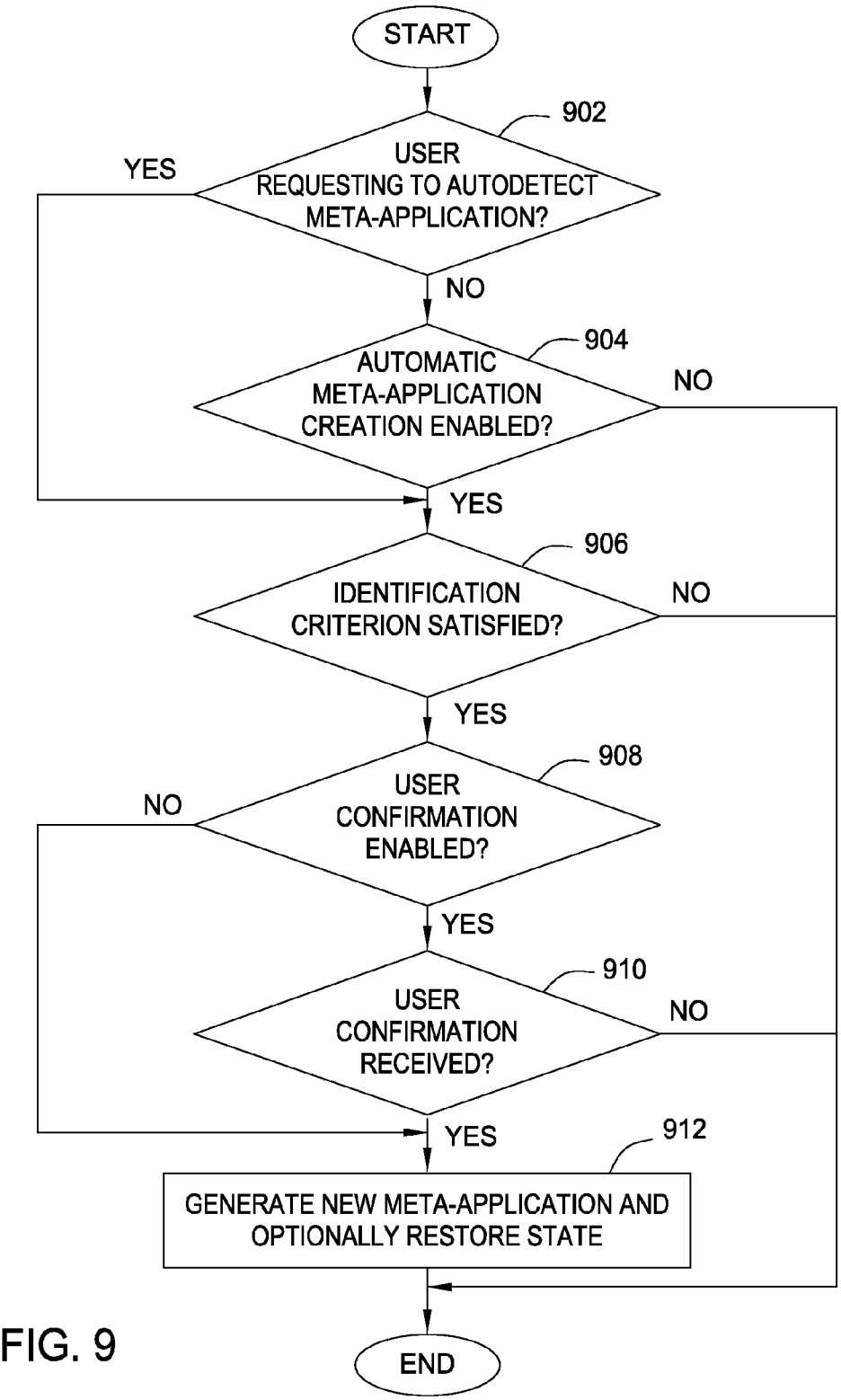
FIG. 9 is a flowchart depicting a method to detect a new meta-application, according to one embodiment presented in this disclosure.

FIG. 9 is a flowchart depicting a method 900 to detect a new meta-application, according to one embodiment presented in this disclosure. The method 900 corresponds to the steps 802-804 of FIG. 8. As shown, the method 900 begins at step 902, where the launcher 102 determines whether the user is explicitly requesting to automatically detect meta-applications. If so, or if automatic meta-application creation is enabled (step 904), the launcher 102 determines whether the identification criterion is satisfied (step 906). If so, the launcher 102 determines whether user confirmation is enabled (step 908). If the user confirmation is not enabled (step 908) or if the user confirmation is both enabled and received (step 910), then the launcher 102 generates a new meta-application and optionally records state information associated therewith (step 912). After the step 912 or in the remaining branches, the method 900 terminates.

Figure 10:
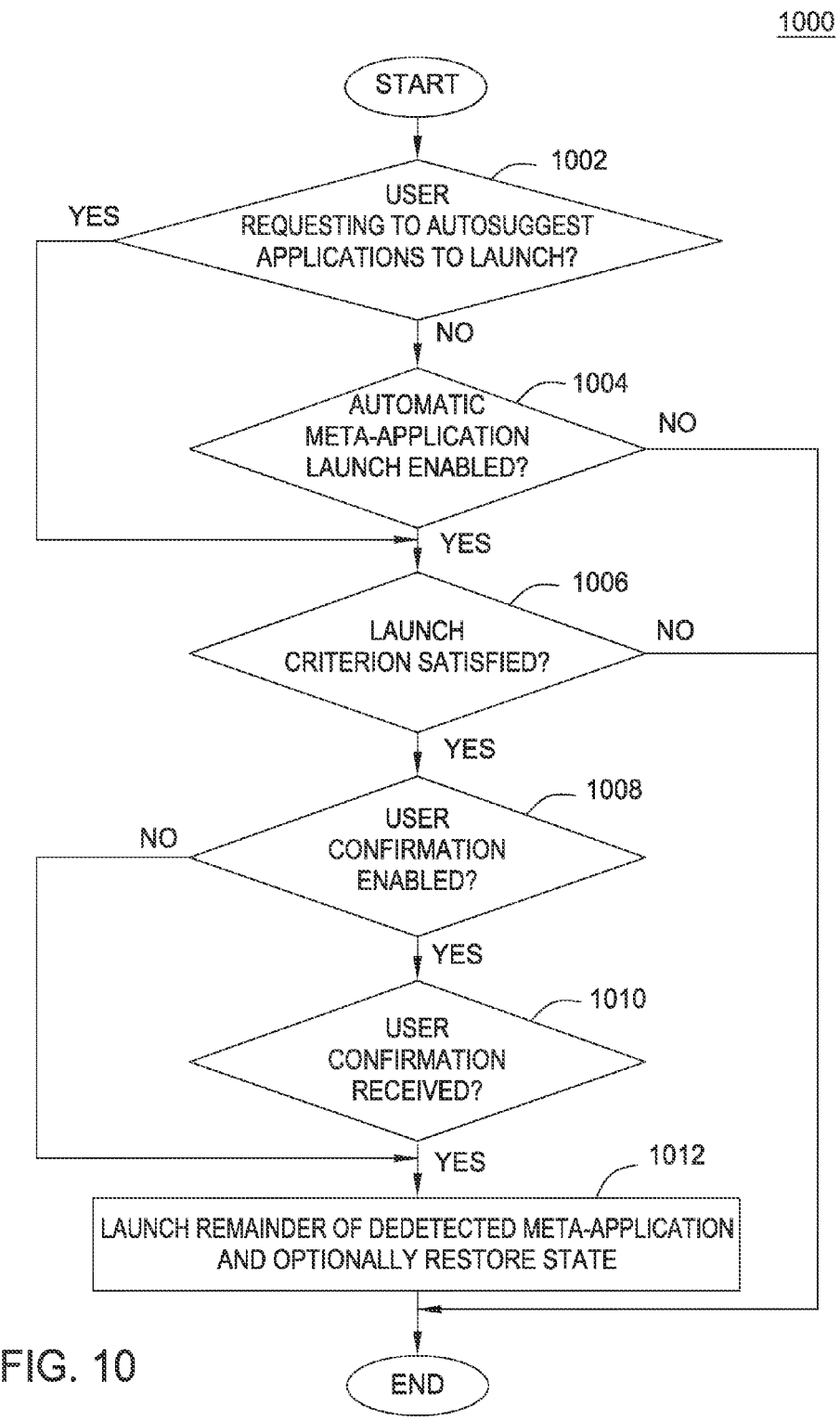
FIG. 10 is a flowchart depicting a method to launch one or more applications missing from a partially matched meta-application, according to one embodiment presented in this disclosure.

FIG. 10 is a flowchart depicting a method 1000 to launch one or more applications missing from a partially matched meta-application, according to one embodiment presented in this disclosure. The method 1000 corresponds to the steps 806-810 of FIG. 8. As shown, the method 1000 begins at step 1002, where the launcher 102 determines whether the user is explicitly requesting to automatically recommend applications to launch. If so, or if automatic meta-application launch is enabled (step 1004), the launcher 102 determines whether the launch criterion is satisfied (step 1006). If so, the launcher 102 determines whether user confirmation is enabled (step 1008). If the user confirmation is not enabled (step 1008) or if the user confirmation is both enabled and received (step 1010), then the launcher 102 launches at least one of the applications missing from the partially matched meta-application and optionally restores state information associated therewith (step 1012). After the step 1012 or in the remaining branches, the method 1000 terminates.

Figure 11:
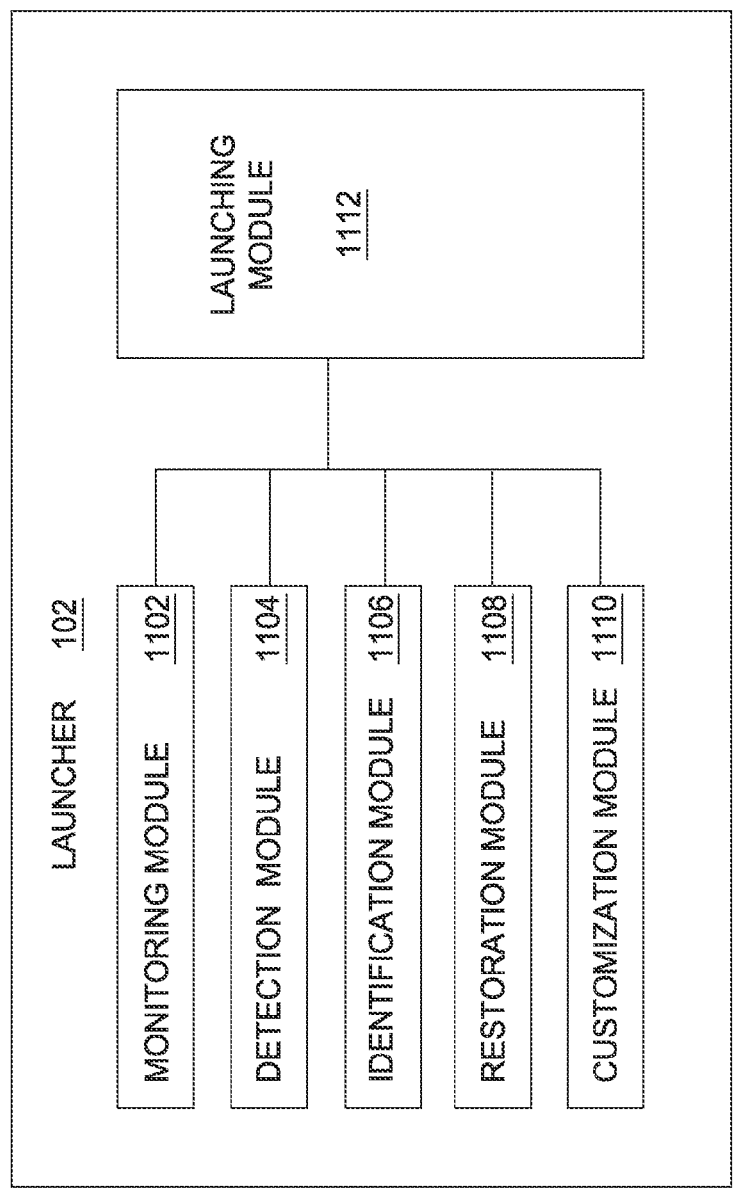
FIG. 11 is a block diagram illustrating components of the launcher tool, according to one embodiment presented in this disclosure.

FIG. 11 is a block diagram illustrating components 1100 of the launcher 102 of FIG. 1, according to one embodiment presented in this disclosure. As shown, the components 1100 include a monitoring module 1102, a detection module 1104, an identification module 1106, a restoration module 1108, a customization module 1110, and a launching module 1112. In some embodiments, each module is uniquely identified by a respective module name in the source code of the launcher 102. In one embodiment, the monitoring module 1102 is configured to monitor application usage of the user according to the techniques disclosed herein. The detection module 1104 is configured to detect new meta-applications to be created according to the techniques disclosed herein.

In one embodiment, the identification module 1106 is configured to determine qualified partial matches of a current user state according to the techniques disclosed herein. The restoration module 1108 is configured to capture and restore state information associated with the applications according to the techniques disclosed herein. The customization module 1110 is configured to present and modify user preferences for the launcher 102, based on user input and according to the techniques disclosed herein. The launching module 1112 is configured to programmatically launch one or more missing applications according to the techniques disclosed herein. The names, types, functionalities, and number of modules of the launcher 102 may be tailored to suit the needs of a particular case.

Accordingly, at least some embodiments presented in this disclosure provide techniques to identify sets of applications that tend to be used concurrently by a user to perform a specific task. If the user subsequently only launches a subset of applications of an identified set, the remaining applications in the identified set may be launched for the user without user intervention, upon user confirmation, or upon user request. Application states may also be captured and subsequently restored for the user. As a result, productivity of the user may be improved at least in some cases.

Figure 12:
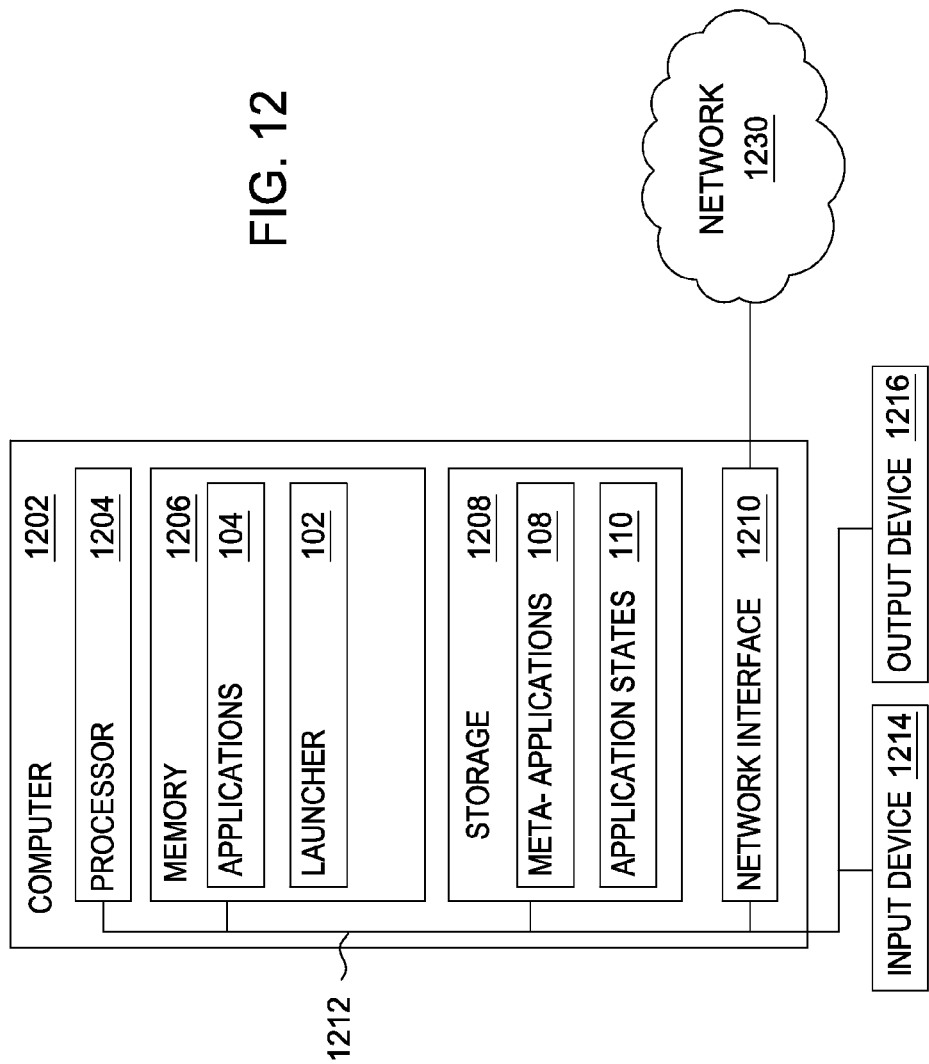
FIG. 12 is a block diagram illustrating components of a networked system configured to manage meta-applications, according to one embodiment presented in this disclosure.

FIG. 12 is a block diagram illustrating components of a networked system 1200 configured to manage meta-applications, according to one embodiment presented in this disclosure. The networked system 1200 includes a computer 1202. The computer 1202 may also be connected to other computers via a network 1230. In general, the network 1230 may be a telecommunications network and/or a wide area network (WAN). In a particular embodiment, the network 1230 is the Internet.

The computer 1202 generally includes a processor 1204 connected via a bus 1212 to a memory 1206, a network interface device 1210, a storage 1208, an input device 1214, and an output device 1216. The computer 1202 is generally under the control of an operating system. Examples of operating systems include UNIX, versions of the Microsoft Windows® operating system, and distributions of the Linux® operating system. More generally, any operating system supporting the functions disclosed herein may be used. The processor 1204 is included to be representative of a single CPU, multiple CPUs, a single CPU having multiple processing cores, and the like. Similarly, the memory 1206 may be a random access memory. While the memory 1206 is shown as a single identity, it should be understood that the memory 1206 may comprise a plurality of modules, and that the memory 1206 may exist at multiple levels, from high speed registers and caches to lower speed but larger DRAM chips. The network interface device 1210 may be any type of network communications device allowing the computer 1202 to communicate with other computers via the network 1230.

The storage 1208 may be a persistent storage device. Although the storage 1208 is shown as a single unit, the storage 1208 may be a combination of fixed and/or removable storage devices, such as fixed disc drives, solid state drives, floppy disc drives, tape drives, removable memory cards or optical storage. The memory 1206 and the storage 1208 may be part of one virtual address space spanning multiple primary and secondary storage devices.

The input device 1214 may be any device for providing input to the computer 1202. For example, a keyboard and/or a mouse may be used. The output device 1216 may be any device for providing output to a user of the computer 1202. For example, the output device 1216 may be any conventional display screen or set of speakers. Although shown separately from the input device 1214, the output device 1216 and input device 1214 may be combined. For example, a display screen with an integrated touch-screen may be used.

As shown, the memory 1206 of the computer 1202 includes the applications 104 and the launcher 102, and the storage 1208 of the computer 1202 includes the meta-applications 108 and application states 110 of FIG. 1. By configuring the launcher 102 according to the techniques disclosed herein and to manage the applications 104, such as to facilitate launching the meta-applications 108 and restoring the application states 110, user productivity on the computer 1202 may be improved at least in some cases.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects presented in this disclosure may be embodied as a system, method or computer program product. Accordingly, aspects disclosed herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects disclosed herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects disclosed herein may be written in any combination of one or more programming languages, including an object oriented programming language such as Java, Smalltalk, C++ or the like and conventional procedural programming languages, such as the "C" programming language or similar programming languages. The program code may execute entirely on the computer of a user, partly on the computer of the user, as a stand-alone software package, partly on the computer of the user and partly on a remote computer, or entirely on the remote computer or server. In the latter scenario, the remote computer may be connected to the computer of the user via any type of network, including a local area network (LAN) or a wide area network (WAN), or the connection may be made to an external computer (for example, through the Internet using an Internet Service Provider).

Aspects presented in this disclosure are described above with reference to flowchart illustrations or block diagrams of methods, apparatus (systems) and computer program products according to embodiments disclosed herein. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the embodiments presented herein, the applications and launcher may execute in the cloud, and the meta-applications and application states may also be stored in the cloud. The launcher may invoke the meta-applications and restore the application states according to the techniques disclosed herein. Thus, the user may access the meta-applications from any computing system attached to a network connected to the cloud (e.g., the Internet) and be charged based on the processing environment(s) used.

The flowchart and block diagrams in the Figures illustrate the architecture, functionality, and operation of possible implementations of systems, methods and computer program products according to various embodiments disclosed herein. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams or flowchart illustration, and combinations of blocks in the block diagrams or flowchart illustration, can be implemented by special-purpose hardware-based systems that perform the specified functions or acts, or combinations of special purpose hardware and computer instructions.

While the foregoing is directed to embodiments presented in this disclosure, other and further embodiments may be devised without departing from the basic scope of contemplated embodiments, and the scope thereof is determined by the claims that follow.

What is claimed is:

1. A computer-implemented method to manage concurrently used applications based on application state, the computer-implemented method comprising:
   upon detecting a first state of a first application, the first state identified as bearing a historical association with a state of a second application in terms of concurrent usage, invoking the second application by operation of one or more computer processors and without requiring any user request to invoke the second application, in order to complete a first meta-application that includes the first and second applications and that excludes a third application, whereupon the state of the second application is restored; and
   upon detecting a second state of the first application, the second state identified as bearing a historical association with a state of the third application in terms of concurrent usage, invoking the third application without requiring any user request to invoke the third application, in order to complete a second meta-application that includes the first and third applications and that excludes the second application, whereupon the state of the third application is restored;
   wherein the first and second states are distinct states, wherein the states of the second and third applications are each of a respective state type selected from a plurality of state types including access to a specified file, access to a specified uniform resource locator, and access to a specified server, of which each state type is restorable, wherein at least one historical association is identifiable based at least in part on each criterion selected from a concurrent usage frequency and a concurrent usage duration, wherein the first and second meta-applications are defined based on monitoring concurrent application usage, including monitoring application states, and without requiring user input explicitly defining any meta-applications.

2. The computer-implemented method of claim 1, wherein each meta-application is uniquely identifiable via a respective meta-application name, wherein each meta-application is launched in a distinct virtual desktop.

3. The computer-implemented method of claim 2, wherein at least one of the first and second applications is invoked by an application manager, wherein the application manager is independently configured to determine each individual criterion for launching the first meta-application, selected from:
   (i) a first criterion comprising receiving a request to launch an entirety of the first meta-application, wherein the request does not identify any application; and (ii) a second criterion comprising receiving a request to launch a remainder of the first meta-application, wherein the request does not identify any application.

4. The computer-implemented method of claim 3, wherein the application manager is further independently configured to determine each individual criterion for launching the first meta-application, selected from:
(iii) a third criterion comprising detecting that one or more, but less than all, of a plurality of applications of the first meta-application are launched, the plurality of applications including the first and second applications;
(iv) a fourth criterion comprising detecting that one or more, but less than all, of the plurality of applications of the first meta-application are currently executing; and
(v) a fifth criterion comprising receiving input confirming to launch the at least one of the plurality of applications of the first meta-application.

5. The computer-implemented method of claim 4, wherein the first and second meta-applications are defined based on application state monitoring in addition to application monitoring, in order to define meta-applications in a manner that more accurately reflects user needs pertaining to application invocation, at least relative to defining meta-applications based only on application monitoring and to the exclusion of application state monitoring.

6. The computer-implemented method of claim 5, wherein the application manager includes a plurality of modules, wherein each of the plurality of modules is uniquely identifiable by a respective module name associated with source code of the application manager, wherein the plurality of modules includes;
(i) a monitoring module configured to monitor the usage of a set of available applications including the first, second, and third applications, wherein the plurality of applications of the first meta-application is a subset of the set of available applications;
(ii) a detection module configured to detect new meta-applications to create;
(iii) an identification module configured to determine qualified partial matches of a current user state;
(iv) a restoration module configured to capture and restore state information associated with the applications;
(v) a customization module configured to present and modify settings of the application manager, based on user input; and
(vi) a launching module configured to launch one or more missing applications.

7. The computer-implemented method of claim 6, wherein the settings of the application manager include:
(i) a first flag specifying whether to identify new meta-applications;
(ii) a second flag specifying whether to prompt for user confirmation of new meta-applications;
(iii) a third flag specifying whether to automatically detect meta-applications to launch; and
(iv) a fourth flag specifying whether to prompt for user confirmation of automatic launching of detected meta-applications.

8. The computer-implemented method of claim 7, wherein the settings of the application manager further include:
(v) a fifth flag specifying whether to automatically load application states; and
(vi) a sixth flag specifying whether to prompt for user confirmation of automatic loading of application states;
(vii) a seventh flag specifying whether to enforce a maximum number of applications in auto-detected meta-applications, wherein the maximum number of applications is user-configurable; and
(viii) an eighth flag specifying whether to customize a frequency of state capture, wherein the frequency is user-configurable.

9. The computer-implemented method of claim 8, wherein the settings of the application manager further include:
(ix) a ninth flag specifying whether to customize a first measure of sensitivity in detecting new meta-applications, wherein the first measure of sensitivity is user-configurable; and
(x) a tenth flag specifying whether to customize a second measure of sensitivity on identifying existing meta-applications, wherein the second measure of sensitivity is user-configurable;
wherein the application manager operates according to the first, second, third, fourth, fifth, sixth, seventh, eighth, ninth, and tenth flags and operates further according to the maximum number of applications, the frequency of state capture, and the first and second measures of sensitivity;
wherein the second application is invoked only upon detecting concurrent use of the first state of the first application and a state of a fourth application, wherein the third application is invoked only upon detecting concurrent use of the second state of the first application and a state of a fifth application.

10. The computer-implemented method of claim 1, wherein the state of the second application is restored only upon identifying the state of the second application as bearing the historical association with the first state in terms of concurrent usage.

11. The computer-implemented method of claim 1, wherein the state of the third application is restored only upon identifying the state of the third application as bearing the historical association with the second state in terms of concurrent usage.

12. The computer-implemented method of claim 1, wherein the first and second meta-applications are defined based on application state monitoring in addition to application monitoring.

13. The computer-implemented method of claim 1, wherein each meta-application is uniquely identifiable via a respective meta-application name.

14. The computer-implemented method of claim 1, wherein each meta-application is launched in a distinct virtual desktop.

15. The computer-implemented method of claim 1, wherein at least one of the first and second applications is invoked by an application manager.

16. The computer-implemented method of claim 15, wherein the application manager includes a plurality of modules.

17. The computer-implemented method of claim 16, wherein the plurality of modules includes at least one of a monitoring module, a detection module, an identification module, a restoration module, a customization module, and a launching module.

18. The computer-implemented method of claim 1, wherein each state type of the plurality of state types is restored.

19. The computer-implemented method of claim 1, wherein the at least one historical association is identified based at least in part on each criterion selected from the concurrent usage frequency and the concurrent usage duration.

20. The computer-implemented method of claim 1, wherein meta-applications are defined in a manner that more accurately reflects user needs pertaining to application invocation, at least relative to defining meta-applications based only on application monitoring and to the exclusion of application state monitoring.

* * * * *